G. W. DURBROW.
FILTERING APPARATUS.
APPLICATION FILED OCT. 22, 1906.
966,179.
Patented Aug. 2, 1910.
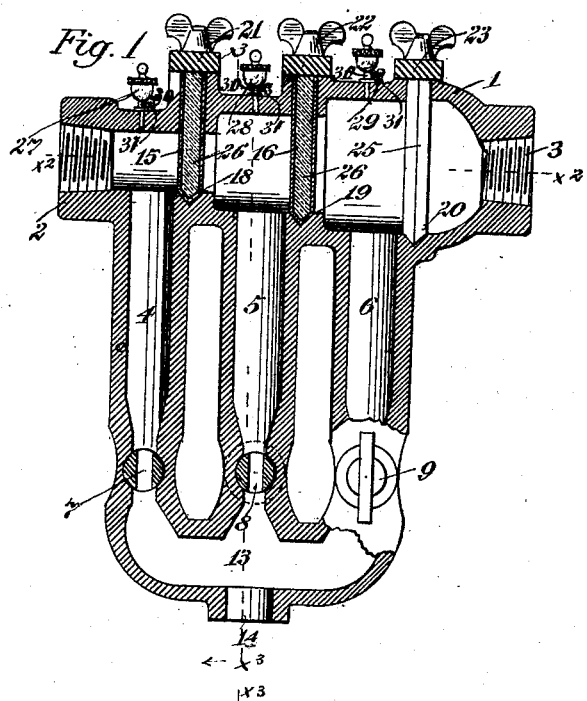
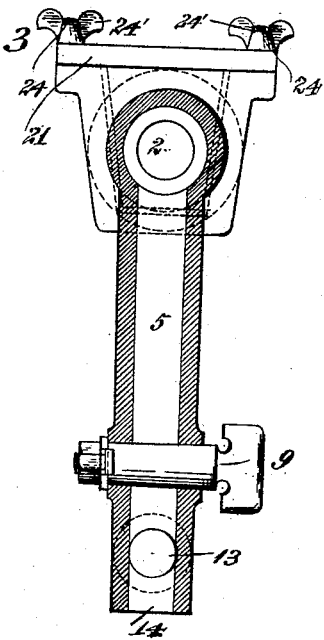
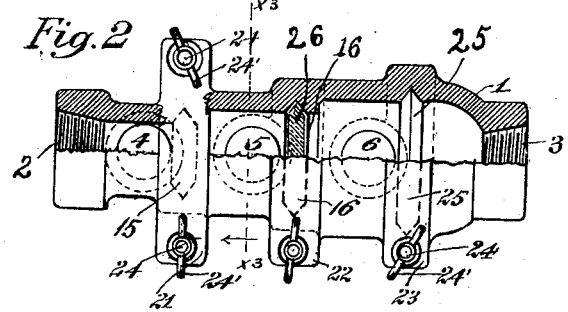
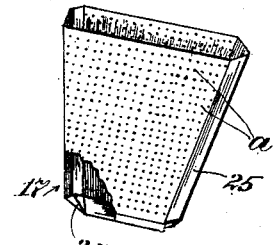
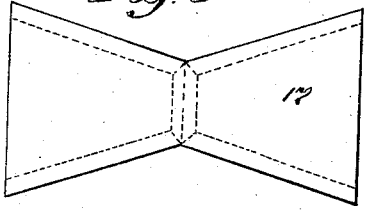
Witnesses:
C. H. Wolf.
Albert H. Merrill
Inventor:
George W. Durbrow.
James R. Townsend
his atty

UNITED STATES PATENT OFFICE.

GEORGE W. DURBROW, OF INDIO, CALIFORNIA.

FILTERING APPARATUS.

966,179.  Specification of Letters Patent.  Patented Aug. 2, 1910.

Application filed October 22, 1906. Serial No. 340,102.

*To all whom it may concern:*

Be it known that I, GEORGE W. DURBROW, a citizen of the United States, residing at Indio, in the county of Riverside and State of California, have invented an Improved Filtering Apparatus, of which the following is a specification.

This invention relates more particularly to, and is an improvement upon, filtering apparatus of the character described in United States Patent No. 828,467, granted to me August 14, 1906.

The objects of this invention are to improve upon the filtering apparatus described in said patent, by providing means for more readily inserting and removing the filtering members for the purpose of cleaning the same or renewing the filtering material; to provide an absolutely water-tight fitting around the filtering members, and to provide an improved cage for holding granulated filtering material.

Another object is to provide a more compact filtering apparatus so that the body portion thereof may be formed as a single casting.

A further object is to provide improved means for infusing into the liquid being filtered, coagulating chemicals that will precipitate impurities into the sediment receptacles with which the apparatus is provided.

Other objects may hereinafter appear.

The invention consists in the general and specific combinations of parts hereinafter described and claimed.

The accompanying drawings illustrate the invention.

Referring to said drawings: Figure 1 is a longitudinal section of the entire apparatus except that the filtering cage nearest the right-hand end of the apparatus is removed. Fig. 2 is a plan view of the apparatus, partly in section. The line $x^2-x^2$, Fig. 1, indicates the line of section for the sectioned portion of the view. Fig. 3 is a cross-section on line $x^3-x^3$ of Figs. 1 and 2. Fig. 4 is a perspective of one of the filtering cages broken away to show the shape of the bottom of the cage. Fig. 5 is a plan view of the sheet metal blank out of which the metal cage is formed, dotted lines indicating where the same is bent.

The conduit 1 which forms the body portion of the filter is provided at one end with an inlet 2 and at the other end with an outlet 3; said conduit increases in size from the inlet to the outlet, and has a series of sediment receptacles or sumps as 4, 5 and 6, located therebeneath, said receptacles being provided with valves 7, 8 and 9, leading into a horizontal channel 13 provided with an outlet 14. The main conduit 1 is provided adjacent to and on the down-stream side of each of the sumps 4, 5 and 6, with a filter proper through which passes all the liquid of the current which flows through the apparatus. The construction thus far described is similar in its main features to that of my former patent above referred to.

15, 16 and 17 designate the filters proper, the filter 17 being removed from the apparatus, as shown in Fig. 1, and shown in detail in Fig. 4.

The filter body 1 is provided with a series of internal grooves 18, 19 and 20, which constitute seats in which the respective filters 15, 16 and 17 are seated. A series of closures such as plates 21, 22, 23, are provided for openings located opposite said seats, preferably in the top side of the body 1, in order that the filters may be readily put in place and removed; fastening devices such as threaded bosses 24 and nuts 24' screwing thereon being provided for clamping said plates against the filters to make the filters fit snugly into their seats.

The filter cages are widest at the top and taper toward the bottom, as best shown in Fig. 4, the seats 18, 19 and 20 being correspondingly tapered away from the closures 21, 22 and 23, so that when said closures are clamped against the top of the filter cages, the latter are tightly wedged into the seats, this effect being augmented by the V-shape of the groove and the corresponding shape of the edge of the filter cages.

Referring more in detail to the structure of the filter cages 15, 16 and 17, each of said cages is preferably of the same form, being made of a sheet-metal blank, shown in Fig. 5, which is bent to form a V-shaped bead 25 extending around the side edges and the bottom of the cage.

Each of the seats 18, 19 and 20 is formed to correspond in shape to that of said bead 25, in order that the filters may be fitted water-tight under the pressure of the closures 21, 22 and 23, which are forced thereagainst by means of the nuts 24'. When clamped in place, said closures close the open tops of the filter cages as well as the openings in the top of the filter-body.

In a small-sized filter, a rubber band, not shown, may be placed around the filter or the filter cage for the purpose of assisting in making the joint water-tight when the cap is in place. In large filters where a rubber band would not be desirable, a gasket of other material could be used instead.

Each of the filter cages is furnished throughout substantially the entire extent of each side face with perforations $a$ for allowing liquid to pass through gravel or other granulated filtering material 26 with which the cages are filled.

While the filter construction illustrated in the drawings and just described, is the construction which I at present deem best for carrying out principles of this invention, it is to be understood that variations may be made at the discretion of the mechanic, without departing from this invention.

One of the advantages secured by the construction of filtering apparatus as above described, other than those possessed by the filtering apparatus set forth in my former patent, is that the sediment receptacles are placed closer together, the whole apparatus being rendered much shorter and more compact, so that it may be formed as a single casting, thereby making a solid construction and lessening the cost of manufacture. The comparatively narrow closures 21, 22 and 23 make this construction possible. Said closures are easily removed and fastened in place and afford a ready means of uncovering the openings at the top side of the filter conduit 1 for the purpose of inserting and removing the filter cages in order to renew the filtering material when this is necessary. Filter cages constructed otherwise than I have described may of course be used in the apparatus without departing from the broad principles of the invention.

For the purpose of more thoroughly separating foreign material from the liquid being filtered, I may provide one or more air tight cups 27, 28, 29, which supply a coagulant such as a liquid solution of sulfate of aluminum, over the sumps, to assist in precipitating the solids thereinto. 30 designates the discharge nipples, and 31 the stopcocks of said cups. In applying the coagulant by means of the cups, different coagulants can be applied; as, in cup 27 caustic soda might be used, in cup 28, sulfate of aluminum, and in cup 29, bicarbonate of soda. I name these coagulants as the best known for the purpose desired. When the three chemicals above specified are used, the effect of the first will be to throw the liquid salts into solids; the second,—sulfate of aluminum,—to assist in removing the salts before they pass through the filter; the third,—bicarbonate of soda,—to soften the water. In cases where the waters to be filtered are of different natures, the applications of different coagulants may be changed as desired. In using different coagulants for the purification of water, they are intended more particularly for the purification of water to be used in steam boilers.

What I claim is:—

1. A filter comprising a horizontal conduit having an inlet at one end and an outlet at the other and provided with top openings and sumps arranged between the openings, valved outlets for the sumps, V-shaped filter-seats registering with the openings, V-shaped filters in the filter-seats and closures for the openings holding the filters in place.

2. A filter comprising a conduit having an inlet at one end and an outlet at the other, said conduit growing larger toward the outlet and provided with openings in its top and with sumps between the openings, valved outlets for the sumps, V-shaped filter-seats registering with the openings, filters having V-shaped edges in said seats, and closures for the openings forcing the filters into the seats.

3. A filter comprising a horizontal conduit having an inlet at one end and an outlet at the other and provided with top side openings and sumps between the openings, valved drains for the sumps, V-shaped filter seats between the sumps registering with the openings, filters having V-shaped edges inserted downwardly into said seats, caps for closing said openings and forcing the filters downwardly into the seats, and removable nuts holding the caps in place.

4. In combination, a conduit having a side opening and an internal seat opposite said opening and extending around the portion of the conduit not occupied by the opening, said seat having side portions tapering away from said opening, a closure for said opening, a filter in said seat tapered to fit the same, and means for clamping said closure against said filter to crowd the same into said seat.

5. In combination, a conduit having a side opening and an internal groove opposite said opening and extending around the portion of the conduit not occupied by the opening, said groove having side portions tapering away from said opening, a closure for said opening, a filter in said groove tapered to fit the same, and means for clamping said closure against said filter to crowd the same into said groove.

6. In combination, a conduit having a side opening and an internal V-shaped groove opposite said opening and extending around the portion of the conduit not occupied by the opening, said groove having side portions tapering away from said opening, a closure for said opening, a filter in said groove having an edge provided with a V- shaped bead to fit said groove, and means for clamping said closure against said filter to crowd the same into said groove.

7. In combination, a conduit having an internal downwardly-tapering seat extending down the sides and across the bottom thereof, a downwardly-tapering filter fitting said seat, there being an opening above said seat large enough to admit the filter, a closure for said opening, and means for clamping said closure against the top of said filter to crowd the filter into said seat.

8. In combination, a conduit having an internal downwardly-tapering groove extending down the sides and across the bottom thereof, a downwardly-tapering filter fitting said groove, there being an opening above said groove large enough to admit the filter, a closure for said opening, and means for clamping said closure against the top of said filter to crowd the filter into said groove.

In testimony whereof, I have hereunto set my hand at Los Angeles California this 16th day of October 1906.

GEORGE W. DURBROW.

In presence of—
  ALBERT H. MERRILL,
  JAMES R. TOWNSEND.